United States Patent Office 3,483,181
Patented Dec. 9, 1969

3,483,181
THIAZOLEAZO HYDROXY-ACENAPHTHENE DYESTUFFS
Gerhard Wolfrum, Opladen, and Hermann Wunderlich, Cologne-Mulheim, Germany, assignors to Farbenfabriken Bayer Aktiengesellschaft, Leverkusen, Germany, a corporation of Germany
No Drawing. Filed July 25, 1966, Ser. No. 567,409
Claims priority, application Germany, July 28, 1965, F 46,740
Int. Cl. C09b 29/10; C07d 91/34
U.S. Cl. 260—158         4 Claims

ABSTRACT OF THE DISCLOSURE

Monoazo dyestuffs comprising an acenaphthol moiety and a thiazole moiety joined by an azo bridge wherein the thiazole moiety can be substituted or unsubstituted which dyestuffs are useful for dyeing and printing synthetic fibers, particularly metal containing polypropylene fibers or fabrics.

---

The present invention relates to monoazo dyestuffs which are insoluble or hardly soluble in water, which correspond the following general formula:

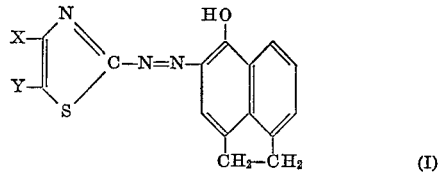

(I)

In this formula X stands for H, an alkyl radical containing 1–4 carbon atoms, a phenyl, halophenyl or alkylphenyl radical and Y stands for H, an alkyl radical containing 1–4 carbon atoms, a phenyl, halophenyl or alkylphenyl radical, or a nitro group.

The new dyestuffs are obtained by coupling a diazotised aminothiazole of the formula

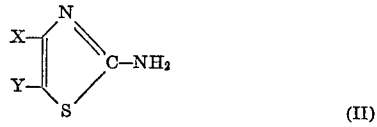

(II)

wherein X and Y have the same meaning as above, with 5-hydroxy-acenaphthene. Coupling is carried out in an aqueous, organic or organic/aqueous medium at acidic, neutral or alkaline pH values. The resulting monoazo dyestuffs which are hardly soluble to insoluble in water, are isolated by filtering them off or, in the case of coupling in an organic solvent, by first precipitating them by the addiiton of water, followed by filtration.

Suitable diazo components are, for example: 2-aminothiazole-(1,3), 2-amino-4-methylthiazole-(1,3), 2-amino-4,5 - dimethylthiazole-(1,3), 2-amino-4-phenylthiazole-(1,3), 2-amino-4-phenyl-5-methylthiazole-(1,3), 2-amino-4-ethylthiazole-(1,3), 2-amino-4,5-diphenylthiazole-(1,3), 2-amino-5-nitrothiazole-(1,3).

The coupling component 5-hydroxy-acenaphthene to be used according to the present process can readily be obtained, for example by methods known from the literature (see German patent specification No. 517,264; Journal of the American Chemical Society, vol. 73, pages 2718–2722 [1951]).

The dyestuffs (I) obtainable according to the present process are eminently suitable for dyeing and printing synthetic fibres, particularly metal-containing polypropylene fibres or fabrics produced therefrom. By the term metal-containing polypropylene fibres, there are chiefly meant nickel-containing polypropylene fibres which contain the nickel, e.g. in the form of nickel chelate complexes. The materials of polypropylene may, however, also contain other metals in the place of nickel or, in addition to nickel, especially aluminum and zinc.

Since the dyestuffs are insoluble or hardly soluble in water, dyeing is expediently carried out in the presence of compounds which have a dispersing action. For accelerating the dyeing, swelling agents may be added to the dyebath in the usual manner; if desired, dyeing can also be carried out at elevated temperatures in closed vessels.

In the following examples, which are given for the purpose of illustrating the invention, the parts are parts by weight; the temperatures are given in degree centigrade.

Example 1

10 parts 2-aminothiazole-(1,3) are dissolved, while stirring, in 50–60 parts 85% ortho-phosphoric acid and gradually mixed at 0–5° with a solution of 6.9 parts sodium nitrite in 30 parts concentrated sulphuric acid. The reaction mixture is stirred at 0–5° for 3 hours and then poured on to ice. An excess of nitrous acid which may be present is removed with amidosulphonic acid and the clear diazonium salt solution is then added to a solution of 17.2 parts 5-hydroxy-acenaphthene in 500 parts 80% acetic acid. When the coupling is completed, the dyestuff is filtered off, washed with water and dried. 26.9 parts of a brown powder are obtained. The dyestuff has the formula

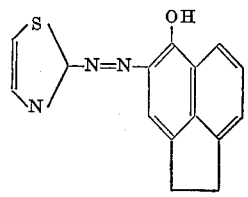

0.2 part of this dyestuff and 0.2 part of a naphthalenesulphonic acid formaldehyde condensation product are dispersed in 400 parts water and adjusted to pH 5–6 with acetic acid. 10 parts nickel-containing polypropylene fibre yarn are introduced into this dyebath and dyed at boiling temperature for 1 hour. After a weakly alkaline aftertreatment at 50° with the addition of 0.5 part of a commercial detergent per 1000 parts of the wash liquor, a blue dyeing with very good fastness to wet processing, rubbing, solvents and light is obtained.

The nickel-containing polypropylene fibres used contain the nickel in the form of nickel chelate complexes, for example nickel phenolates of bis-(alkylphenol) monosulphides. They also contain spun into them UV-absorbents and stabilisers.

Very valuable dyeings on metal-containg, especially nickel-containing polypropylene are also obtained when, instead of the 2-aminothiazole-(1,3) in the first example, the following diazo components are employed and coupled with 5-hydroxy-acenaphthene:

| Diazo component: | Shade on nickel-containing polypropylene |
|---|---|
| 2-amino-4-methylthiazole-(1,3) | Blue. |
| 2-amino-4-ethylthiazole-(1,3) | Blue. |
| 2-amino-4,5-dimethylthiazole-(1,3) | Blue. |
| 2-amino-4-phenylthiazole-(1,3) | Blue. |
| 2-amino-4,5-diphenylthiazole-(1,3) | Blue. |
| 2-amino-5-nitrothiazole-(1,3) | Strong greenish blue. |

We claim:
1. A monoazo dyestuff of the formula

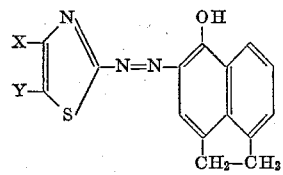

wherein X stands for hydrogen, lower alkyl having 1–4 carbon atoms, phenyl, or lower alkyl phenyl, Y stands for hydrogen, lower alkyl having 1–4 carbon atoms, phenyl, or lower alkylphenyl.

2. A dyestuff of claim 1 corresponding to the formula

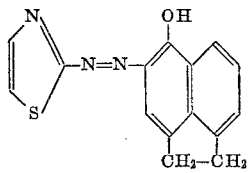

3. A dyestuff of claim 1 corresponding to the formula

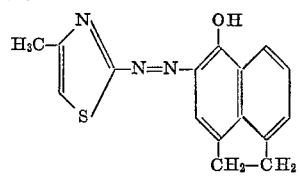

4. A dyestuff of claim 1 corresponding to the formula

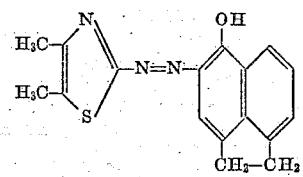

References Cited

UNITED STATES PATENTS 3,222,353 12/1965 Turbak _____ 260—158
3,318,865 5/1967 Stright _____ 260—158

OTHER REFERENCES

Kaneniwa, Chemical Abstracts, vol. 53, p. 4541 (1960).

FLOYD D. HIGEL, Primary Examiner

U.S. Cl. X.R.

8—41, 71; 260—306.8, 619